US PATENT 3,838,168 — Patented Sept. 24, 1974

3,838,168
α-METHYLENATION OF γ-BUTYROLACTONES

William L. Parker, North Brunswick, N.J., and Francis Johnson, Newton Lower Falls, Mass., assignors to The Dow Chemical Company, Midland, Mich.
No Drawing. Continuation of abandoned application Ser. No. 878,901, Nov. 21, 1969. This application Sept. 26, 1972, Ser. No. 292,291
Int. Cl. C07d 5/06
U.S. Cl. 260—326.36                     10 Claims

ABSTRACT OF THE DISCLOSURE

A process for making α-methylenated γ-butyrolactones having the formula

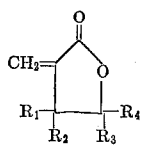

wherein $R_1$–$R_4$ are hydrogen or inert, substantially non-interfering organic groups, comprises reacting the corresponding α-carboxy-γ-butyolactone with formaldehyde in an acidic medium, and preferably in the presence of a dialkylamine catalyst. In example, α-carboxy-γ-phenyl-γ-butyrolactone was reacted with formaldehyde in the presence of diethylamine and in a glacial acetic acid/sodium acetate reaction medium to give the corresponding α-methylenated product.

CROSS-REFERENCE TO RELATED APPLICATION

This is a continuation of application Ser. No. 878,901, filed Nov. 21, 1969, now abandoned.

BACKGROUND OF THE INVENTION

α-Methylenated γ-butyrolactones are a well-known class of compounds having many uses, particularly as biologically active materials; they are represented by the structural formula (I)

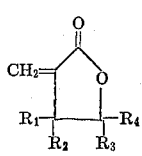

wherein $R_1$–$R_4$ are hydrogen or various organic groups, such as alkyl, aryl, etc., and $R_1$ may be joined with $R_4$ to form a 5- or 6-membered lactone ring or a cycloaliphatic or heterocyclicaliphatic fused ring. In the latter instance, i.e., when $R_1$ is joined with $R_4$, complex ring structures having a plurality of fused 5- and/or 6-membered rings are also known; examples of which include many natural products, such as avenaciolide, alantolactone, costunolide, lulenalin, and the like. The corresponding α-carboxy-γ-butyrolactones are likewise known.

A method of preparing α-methylenated γ-lactones from the corresponding α-carboxylated γ-lactones was described by E. E. van Tamelen et al., J. Am. Chem. Soc., 77, 4683 (1955). Tamelen reacted the α-carboxy-γ-lactone with formaldehyde in the presence of diethylamine to form α-diethylaminomethyl-γ-lactone which was isolated and further reacted in a two-step process with $CH_3I$ and $NaHCO_3$ to form the α-methylenated product in about 26% overall yield. The reported reaction time was about 3 days.

The α-methylenated products have known utility as fungicides, antibiotics, etc., as illustrated by Jones et al., J. Chem. Soc., 230 (1955) and Brookes et al., J. Chem. Soc., 5385 (1963).

SUMMARY OF THE INVENTION

It has now been discovered that α-methylene-γ-butyrolactones having formula I above are produced in high yields and purity in the novel process comprising reacting (a) a lactone having the structural formula (II)

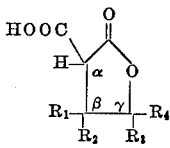

wherein $R_1$, $R_2$, $R_3$ and $R_4$ are hydrogen or an inert, substantially non-interfering organic groups, with (b) formaldehyde. The process is conducted in an acidic medium and preferably in the presence of a dialkylamine catalyst, such as diethylamine. The α-methylenated products are known to be useful as fungicides, antibiotics and insecticides.

Under the subject reaction conditions, namely acidic conditions, the reaction rate is very high and the reaction is substantially completed in about 1 to 5 minutes. Under basic conditions, if the reaction occurs at all, the rate is quite low (as evidenced by the Tamelen reference). The completion of the reaction is indicated by the cessation of carbon dioxide evolution. If desired, the reactants may be maintained in contact after the evolution of $CO_2$ has subsided for periods of several hours, although little if any advantage in product yield is realized.

The acidity of the reaction mixture is generally established and maintained at a pH of 2 to below 7, and preferably 3 to 5, by the inclusion of a buffered acidic mixture consisting essentially of a major proportion of a weak acid and a minor proportion of its sodium or potassium salt. Suitable such acids include organic acids having 2 to about 4 carbon atoms, such as acetic, propionic, trifluoroacetic and n-butyric acid and inorganic acids such as monosodium phosphate and the like. Acetic acid and sodium or potassium acetate is the preferred acid-salt mixture.

The pH of such acidic mixtures which contain little or no water is determined by measuring the pH of a 50% aqueous or water-methanol solution of the buffered acidic mixture.

The amount of acid in the reaction is not critical so long as it is sufficient to maintain the reaction mixture at an acidic pH. However, the acid is advantageously and preferably used in substantial excess so as to serve as the reaction medium. Other solvents, such as water, lower alkanols of 1 to about 4 carbon atoms, ethers, such as ethyl ether and tetrahydrofuran, ketones, such as acetone and methyl ethyl ketone, and other like compounds and mixtures of such compounds may be suitably used as solvents if desired.

The reaction temperature is suitably selected between about 0° C. and about 120° C. Preferably, the reactants are mixed together at about room temperature, allowed to exotherm, and then warmed at about 70–100° C. for about 5 to 60 minutes after the exotherm has subsided. The post-exotherm heating period is not critical but is useful in insuring complete reaction.

The reaction pressure is not critical and superatmospheric, atmospheric or subatmospheric pressures may be used. Atmospheric pressure is convenient and therefore preferred. An inert atmosphere is likewise preferred, such as nitrogen.

The reaction catalyst is a dialkylamine, N-alkylalkanolamine or dialkanolamine. Each group attached to the amino nitrogen suitably has up to about 10 carbon atoms, and preferably has 1 to about 4 carbon atoms. Examples of such amines include dimethylamine, diethylamine, dibutylamine, dioctylamine, N-methylethanolamine, diethanolamine, bis($\beta$-hydroxypropyl)amine, and other like amines. Mixtures of such amines are also operable. The catalyst may be included in the reaction in substantially any amount, e.g., a small but catalytic amount up to equimolar quantities or more with respect to the lactone, so long as sufficient acid is present to maintain the reaction mixture at an acid pH. The reaction rate increases with increasing amounts of catalyst.

Any source of formaldehyde can be used since the polymers of formaldehyde are decomposed to formaldehyde itself under acidic conditions. Accordingly, formalin, trioxane and para-formaldehyde are suitable sources of formaldehyde in the subject reaction.

The amount of formaldehyde in the reaction may be varied but the stoichiometry of the reaction requires one mole of formaldehyde per carboxyl group replaced. Accordingly, at least one mole of formaldehyde is added per mole of lactone reactant, and an excess of formaldehyde is preferred, such as between 1 and about 7 moles of formaldehyde per mole of lactone.

The $\gamma$-butyrolactone reactant is represented by formula II above, and may be selected from the known class of compounds represented by II. Suitable $R_1$–$R_4$ groups are hydrocarbon groups, such as alkyl, aryl, aralkyl, alkaryl, cycloaliphatic, alkenyl, and the like, or carboxy or carboalkoxy. Examples of lactone reactants bearing such substituents include those of formula II wherein:

TABLE I

| $R_1$ | $R_2$ | $R_3$ | $R_4$ |
|---|---|---|---|
| H | H | H | H |
| H | H | H | $CH_3$ |
| H | n-Butyl | H | H |
| H | H | H | Cyclohexyl |
| H | H | H | n-$C_{13}H_{27}$ |
| H | $CH_3$ | n-Propyl | n-Propyl |
| $CH_3$ | $CH_3$ | H | H |
| H | H | H | Phenyl |
| H | H | H | Benzyl |
| H | H | H | 2-Phenethyl |
| H | 2-Phenylpropyl | H | H |
| $CH_3$ | H | H | Benzyl |
| H | H | H | Allyl |
| H | Carboxy | H | n-$C_{13}H_{27}$ |
| H | ----do---- | H | n-$C_8H_{17}$ | or $R_1$–$R_4$ may suitably be a group having the formula $\text{-(CH}_2\text{)}_n\text{COOR}$, $\text{-(CH}_2\text{)}_n\text{CONHR}$ or $\text{-(CH}_2\text{)}_n\text{CONRR}$, wherein R is alkyl, aryl, aralkyl or alkaryl, and $n$ is an integer of 0 to about 6, examples of which include the compounds:

TABLE II

| $R_1$ | $R_2$ | $R_3$ | $R_4$ |
|---|---|---|---|
| H | H | H | —$COOCH_3$ |
| H | H | H | —$COOC_8H_{17}$ |
| H | H | H | —$CH_2$—$CONH$—$C_4H_9$ |
| —$COOC_4H_9$ | H | H | H |
| —$CONH$—$C_6H_5$ | H | H | H |
| H | H | H | —$CON(C_2H_5)_2$ |
| H | H | H | $\text{-(CH}_2\text{)}_6\text{-CONH-CH}_3$ |
| $\text{-(CH}_2\text{)}_4\text{-CONH-CH}_2C_6H_5$ | H | H | H |
| H | H | H | $\text{-(CH}_2\text{)}_2\text{-CONH-C}_6H_4CH_3$ |
| H | H | H | $CH_2$—$CO$—N⟨ | and the like; or $R_1$ and $R_4$ join to form a 5- or 6-membered fused lactone ring or a cycloaliphatic or heterocyclicaliphatic group, the hetero atom being oxygen, sulfur or nitrogen, examples of which include the following compounds:

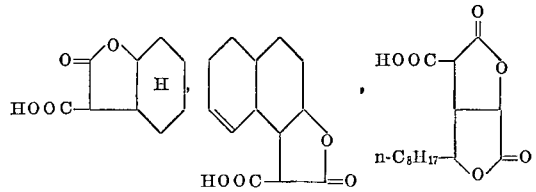

Generally, $R_1$–$R_4$ are hydrogen or groups as defined and illustrated above having from 1 to about 20 carbon atoms. Preferred lactone reactants are those wherein $R_1$ is hydrogen and $R_2$–$R_4$ are hydrogen or groups having 1 to about 10 carbon atoms.

As a general procedure, the lactone is mixed with a stock methylenation solution at about room temperature and then warmed at a desired temperature until the product is formed; said stock methylenating solution consisting essentially of an organic acid and its sodium or potassium salt, a source of formaldehyde and an amine catalyst.

An alternative procedure comprises mixing the lactone with an aqueous solution of formaldehyde and amine catalyst, isolating the glassy product thus formed by any suitable means, such as extraction with methylene chloride, and then mixing the glassy product with an organic acid and its sodium or potassium salt. In some instances, this alternative procedure is advantageous.

SPECIFIC EMBODIMENTS

The following examples further illustrate the invention.

Preparation of the Stock Methylenating Solution

Sodium acetate (105 mg.) was dissolved in 4.0 ml. of glacial acetic acid and to this solution was added 2.92 ml. of formalin (37%) and 1.0 ml. of diethylamine.

Example 1.—The Preparation of α-Methylene-γ-Phenyl-butyrolactone

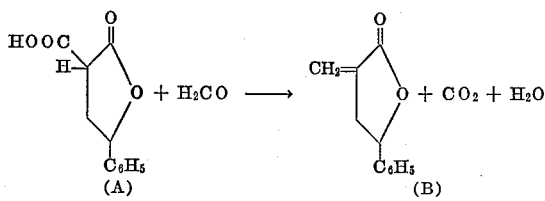

A cis-trans mixture of (A), 1.5 g., was mixed with 7.28 ml. of the stock methylenating solution. Effervescence occurred immediately and subsided after about 5 min. at room temperature. The reaction mixture was warmed on a steam bath for 10 min., cooled and poured into water. The products, (B), was extracted from the aqueous mixture with ethyl ether. The ether extract was sequentially washed with water, a saturated aqueous sodium bicarbonate solution, water, 0.1 N HCl, water, and then dried over MgSO$_4$. The solvent was removed under reduced pressure to leave 0.76 of a clear, colorless liquid, which crystallized upon standing. The product was recrystallized in ethyl ether. Melting point 52.5–53.5° C. The structure was confirmed by infrared (IR), nuclear magnetic resonance (NMR), and elemental analysis. Found: C, 75.8%; H, 5.8%. Calculated for $C_{11}H_{10}O_2$: C, 75.84%; H, 5.79%.

Example 2

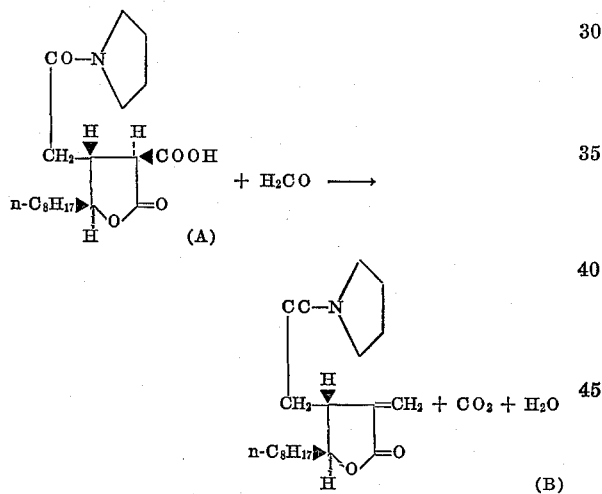

0.15 g. of (A) was mixed with 0.4 ml. of the stock methylenating solution. Effervescence occurred immediately and subsided after about 5 min. at room temperature. The reaction mixture was warmed on a steam bath for 10 min. and worked up according to the procedure set forth in Example 1. The product (0.087 g.) was a colorless liquid. The structure was confirmed by IR and NMR analysis.

Example 3.—The Preparation of d,l-Avenaciolide

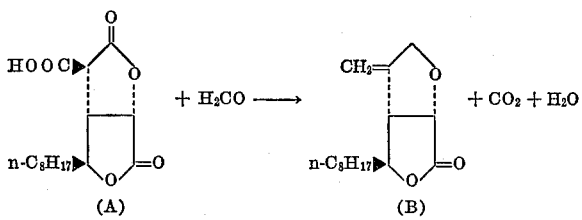

295.3 mg. of (A) was mixed with 1 ml. of the stock methylenating solution. Effervescence occurred immediately and subsided after about 1 min. The reaction mixture was warmed on a steam bath for 5 min. and worked up according to the procedure set forth in Example 1. The crude product (m.p. 44–51° C.) was chromatographed on silica gel. Elution was 5% ethyl ether in benzene (volume/volume basis) gave 172.9 mg. of d,l-avenanciolide; melting point 54–57° C. The structure was confirmed by IR and NMR analysis.

Similar results are obtained by replacing formaline in the stock solution with trioxane or paraformaldehyde. Likewise, similar results are obtained by using other lactone reactants as described above.

We claim:

1. A process for preparing α-methylenated γ-butyrolactones comprising the step of reacting by contacting in an acidic medium at a pH of from 2 to below 7,
   (a) an α-carboxylated γ-butyrolactone,
   (b) formaldehyde, formalin, trioxane or paraformaldehyde, and
   (c) a dialkylamine, N-alkylalkanolamine or dialkanolamine catalyst, each alkyl or alkanol group of which has from 1 to 10 carbon atoms.
2. The process defined in Claim 1 wherein at least one mole of (b) is present per mole of (a).
3. The process defined in Claim 2 wherein from 1 to about 7 moles of (b) are present per mole of (a).
4. The process defined in Claim 1 wherein (a) is

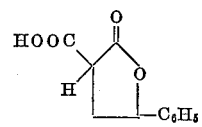

5. The process defined in Claim 1 wherein (a) is

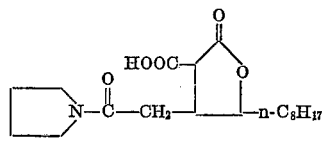

6. The process defined in Claim 1 wherein (a) is

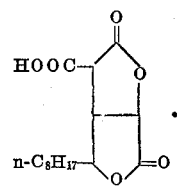

7. The process defined in Claim 1 wherein said pH is from 3 to 5.
8. The process defined in Claim 1 wherein each alkyl or alkanol groups attached to the amino nitrogen has from 1 to 4 carbon atoms.
9. The process defined in Claim 6 wherein said process is conducted in a buffered acidic medium consisting essentially of a major porportion of an aliphatic hydrocarbon carboxylic acid having 2 to 4 carbon atoms and a minor proportion of its sodium or potassium salt.
10. The process defined in Claim 9 wherein said acid is acetic acid and said catalyst is diethylamine.

References Cited

E. E. van Tamelen et al.: J.A.C.S., 77, 4683, (1965).

DONALD G. DAVIS, Primary Examiner

A. M. T. TIGHE, Assistant Examiner

U.S. Cl. X.R.

260—343.3, 343.6

UNITED STATES PATENT OFFICE
CERTIFICATE OF CORRECTION

PATENT NO. : 3,838,168
DATED : September 24, 1974
INVENTOR(S) : William L. Parker and Francis Johnson It is certified that error appears in the above-identified patent and that said Letters Patent are hereby corrected as shown below:

Column 1, line 25: Delete "α-carboxy-γ-butyolactone" and insert therefor --α-carboxy-γ-butyrolactone--.

Column 5, line 1: Delete "Prep aration" and insert therefor --Preparation--.

Column 5, line 16: Delete "products" and insert therefor --product--.

Column 5, line 41: Delete " CC-N " and insert therefor -- CO-N--.

Column 6, line 5: Delete "was" and insert therefor --with--.

Column 6, line 55, Claim 9: Delete "Claim 6" and insert therefor --Claim 1--.

Column 6, line 57, Claim 9: Delete "porportion" and insert therefor --proportion--.

Column 6, line 64: Delete "(1965)" and insert therefor --(1955)--.

Signed and Sealed this twenty-second Day of July 1975

[SEAL]

Attest:

RUTH C. MASON
Attesting Officer

C. MARSHALL DANN
Commissioner of Patents and Trademarks